US012157023B2

(12) United States Patent
Penden

(10) Patent No.: US 12,157,023 B2

(45) Date of Patent: Dec. 3, 2024

(54) CARTRIDGE REPLACEMENT AID

(71) Applicant: Kidde-Fenwel, LLC, Ashland, MA (US)

(72) Inventor: Karl F. Penden, Rumford, RI (US)

(73) Assignee: Kidde-Fenwal, LLC, Ashland, MA (US)

( * ) Notice: Subject to any disclaimer, the term of this patent is extended or adjusted under 35 U.S.C. 154(b) by 307 days.

(21) Appl. No.: 17/248,019

(22) Filed: Jan. 5, 2021

(65) Prior Publication Data

US 2021/0220685 A1 Jul. 22, 2021

Related U.S. Application Data

(60) Provisional application No. 62/963,606, filed on Jan. 21, 2020.

(51) Int. Cl.
*A62C 35/68* (2006.01)
*A62C 35/64* (2006.01)

(52) U.S. Cl.
CPC ............ *A62C 35/68* (2013.01); *A62C 35/645* (2013.01)

(58) Field of Classification Search
CPC .............................. A62C 35/68; A62C 35/645
USPC ....................... 169/16–22, 26, 30–76, 85, 88
See application file for complete search history.

(56) References Cited

U.S. PATENT DOCUMENTS 2,703,546 A 3/1955 Allen
3,915,236 A * 10/1975 Stichling .............. A62C 35/605 200/61.08
2019/0374803 A1 12/2019 Ryczek

FOREIGN PATENT DOCUMENTS

CN 106535996 A 3/2017
EP 3554651 A2 10/2019

OTHER PUBLICATIONS

EP Application No. 21152570.4, Search Report, Jun. 7, 2021, 7 pages.

* cited by examiner

*Primary Examiner* — Christopher S Kim
(74) *Attorney, Agent, or Firm* — Honigman LLP

(57) ABSTRACT

A cartridge replacement aid and a fire suppression system for incorporating the same are provided. The cartridge replacement aid helps to ensure that a disposable cartridge is removed and replaced after actuation. The cartridge replacement aid includes an aperture configured to allow a cartridge to pass through the cartridge replacement aid and connect to a valve, and a protrusion configured to perpendicularly extend from the cartridge replacement aid. The protrusion of the cartridge replacement aid, in certain instances, is configured to break when the fire suppression system is actuated. The protrusion of the cartridge replacement aid, in certain instances, is configured to prevent the cam of the fire suppression system from being reset without removing the cartridge replacement aid.

11 Claims, 7 Drawing Sheets

CARTRIDGE REPLACEMENT AID

CROSS REFERENCE TO A RELATED APPLICATION

The application claims the benefit of U.S. Provisional Application No. 62/963,606 filed Jan. 21, 2020, the contents of which are hereby incorporated in their entirety.

BACKGROUND

Fire suppression systems for commercial cooking applications are often actuated by disposable cartridges that are filled with compressed gases, such as, for example, nitrogen or carbon dioxide. These disposable cartridges are used to pressurize the actuation line and open the valve(s) to allow the fire suppression agent to discharge. Without a fully pressurized disposable cartridge, the fire suppression system cannot discharge the fire suppression agent.

To ensure that the fire suppression system is ready to discharge the fire suppression agent in the event of a fire, standards bodies such as the National Fire Protection Association (NFPA) require testing and inspection of the fire suppression system semi-annually for commercial kitchens. To be prepared for the next test or potential fire, the disposable cartridges in the system need to be replaced following each discharge, as the disposable cartridges can only be used for one actuation. A current limitation of many fire suppression systems is the inability to visually inspect whether the disposable cartridge within the fire suppression system has been discharged and needs to be replaced.

Accordingly, there remains a need for a cartridge replacement aid that provides a visual indication as to whether the disposable cartridge within the fire suppression system is fully pressurized or has been discharged and needs to be replaced.

BRIEF DESCRIPTION

According to one embodiment, a fire suppression system is provided, which includes a cartridge for holding a pressurized gas, the cartridge operatively connected to a valve; a cam for engaging a piercing pin, the piercing pin configured to release the pressurized gas when engaged; and a cartridge replacement aid configured between the cartridge and the cam. The cartridge replacement aid includes an aperture configured to allow the cartridge to pass through the cartridge replacement aid and connect to the valve; and a protrusion configured to perpendicularly extend from the cartridge replacement aid.

In accordance with additional or alternative embodiments, the cartridge replacement aid is configured to fit over at least a portion the valve.

In accordance with additional or alternative embodiments, the cartridge replacement aid is configured within a control box, the control box including a window configured to allow the cartridge replacement aid to be visually inspected.

In accordance with additional or alternative embodiments, the cam includes a projection, the projection configured to break the protrusion of the cartridge replacement aid when engaging the piercing pin.

In accordance with additional or alternative embodiments, a broken protrusion indicates that the cartridge has not been replaced.

In accordance with additional or alternative embodiments, the cam includes a projection, the projection in combination with the protrusion configured to prevent the cam from being reset without removing the cartridge replacement aid.

In accordance with additional or alternative embodiments, the cartridge replacement aid further includes a collar configured to perpendicularly extend from the cartridge replacement aid circumferentially around the aperture.

In accordance with additional or alternative embodiments, the collar is configured to prevent the cam from being reset without removing the cartridge replacement aid.

In accordance with additional or alternative embodiments, an aperture diameter of the cartridge replacement aid is smaller relative to a cartridge diameter.

In accordance with additional or alternative embodiments, the aperture diameter prevents the removal of the cartridge replacement aid without removing the cartridge.

In accordance with additional or alternative embodiments, the cartridge replacement aid is produced using an injection molding process.

In accordance with additional or alternative embodiments, the cartridge replacement aid is produced using a three-dimensional (3D) printing process.

In accordance with additional or alternative embodiments, the fire suppression system further includes a cylinder for holding a fire suppression agent.

In accordance with additional or alternative embodiments, the fire suppression agent includes at least one of: sodium bicarbonate, potassium bicarbonate, and monoammonium phosphate.

According to another aspect of the disclosure, a cartridge replacement aid is provided. The cartridge replacement aid includes an aperture configured to allow a cartridge to pass through the cartridge replacement aid and connect to a valve; and a protrusion configured to perpendicularly extend from the cartridge replacement aid.

In accordance with additional or alternative embodiments, the cartridge replacement aid further includes a collar configured to perpendicularly extend from the cartridge replacement aid circumferentially around the aperture.

In accordance with additional or alternative embodiments, the cartridge replacement aid is configured to be placed between a cartridge and a cam within a fire suppression system.

In accordance with additional or alternative embodiments, the cartridge replacement aid is configured to fit over at least a portion of a valve of a fire suppression system.

In accordance with additional or alternative embodiments, the protrusion is configured to be broken by a projection of a cam.

In accordance with additional or alternative embodiments, a broken protrusion indicates that a cartridge has not been replaced.

In accordance with additional or alternative embodiments, the protrusion in combination with a projection of a cam prevents the cam from being reset.

In accordance with additional or alternative embodiments, an aperture diameter of the cartridge replacement aid is smaller relative to a cartridge diameter.

In accordance with additional or alternative embodiments, the cartridge replacement aid is produced using an injection molding process.

In accordance with additional or alternative embodiments, the cartridge replacement aid is produced using a three-dimensional (3D) printing process.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

Figure 1:
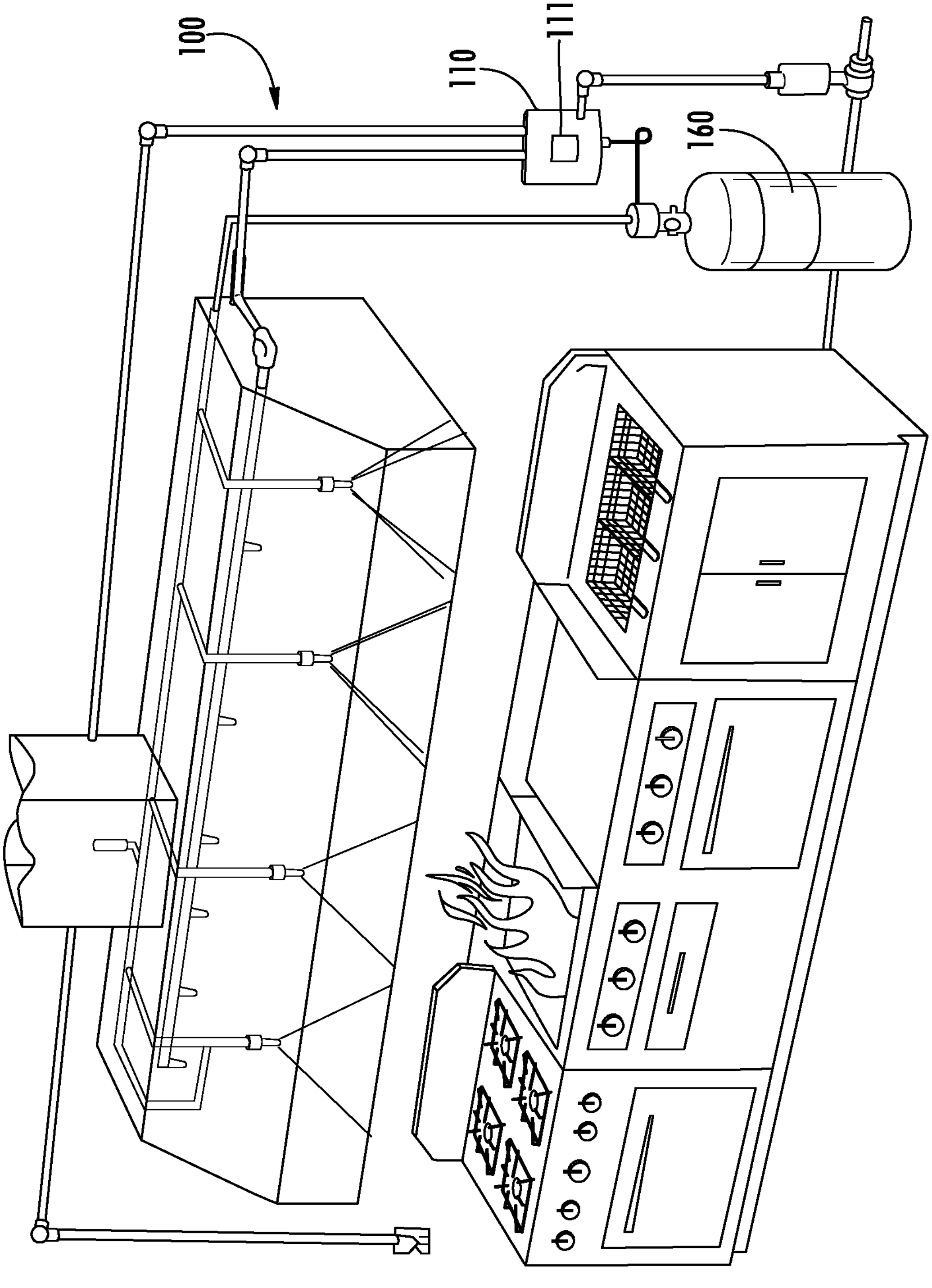
FIG. 1 is a schematic illustration of a fire suppression system in accordance with one aspect of the disclosure.

Visually inspecting whether a disposable cartridge has been discharged and is in need of replacement can be difficult. For example, it may be difficult to know whether a disposable cartridge within a pressurized gas triggering device has been discharged and is in need of replacement without removing the cartridge from an operational position (e.g., to inspect a breakable seal on the cartridge indicating usage). To provide a visual indication as to whether a disposable cartridge, for example, within a pressurized gas triggering device, has been discharged without removing the disposable cartridge from an operational position, a cartridge replacement aid is provided. It is envisioned that the cartridge replacement aid may be used for any pressurized gas triggering device. A pressurized gas triggering device may include any device which uses a disposable cartridge. An example of a pressurized gas triggering device can include the actuation mechanism of a fire suppression system. Although the cartridge replacement aid is capable of being used within any pressurized gas triggering device, for purposes of clarity and brevity, the cartridge replacement aid has only been depicted within a fire suppression system.

Fire suppression systems can be actuated by discharging a disposable cartridge. The fire suppression system may, in certain instances, use the disposable cartridge to force open the valve(s) of the cylinder(s) holding the fire suppression agent so that the fire suppression agent can be discharged through the piping system and out of the nozzles to extinguish a detected fire risk. To ensure that the disposable cartridge is ready and able to actuate the fire suppression system the disposable cartridge should be replaced following each actuation. To help ensure the cartridge is replaced, a cartridge replacement aid is provided. The cartridge replacement aid, in certain instances, helps to ensure that the disposable cartridge is replaced by providing a visual indication that the fire suppression system has been previously actuated and/or physically preventing the reset of the discharged fire suppression system without removing the cartridge.

As explained previously, to actuate a fire suppression system the disposable cartridge can be discharged to release fire suppression agent. The disposable cartridge within the system can, in certain instances, be either manually, via a pull station, mechanically, via fusible links and cables, or electrically, via a control panel, discharged. To discharge the disposable cartridge a breakable seal of the cartridge can be punctured or otherwise mechanically broken to release pressurized gas (e.g. carbon dioxide). In some exemplary systems a piercing pin may be used to puncture the breakable seal of the cartridge and release the pressurized gas. In a further example of an exemplary system, the piercing pin may, in certain instances, be engaged by the rotation of a cam. The pressurized gas, once released from within the cartridge, can be used to pressurize a mechanism which opens the valve(s) to discharge the fire suppression agent.

The fire suppression system is designed to be reset following each discharge event. The resetting of the fire suppression system may contain multiple steps, including, but not limited to: replacing or refilling the cylinder(s) holding the fire suppression agent; purging and/or cleaning the fire suppression piping circuit(s) (e.g., including the discharge nozzles), resetting the mechanism that opens the valve(s); resetting the piercing pin in a ready-to-engage position, which may include rotating a cam; moving (e.g. sliding or rotating) the piercing pin against a spring force which is release by a discharging device (e.g. fusible link, pull station, and the like); and replacing the disposable cartridge with a full cartridge, which contains enough pressurized gas to pressurize the mechanism which opens the valve(s) to discharge the fire suppression agent.

For the fire suppression agent to be able to discharge, the disposable cartridge needs to contain enough pressurized gas to cause the valve(s) to open. As such, one of the most critical aspects of resetting of the fire suppression system can be the replacement of the disposable cartridge. Without replacing the disposable cartridge, the fire suppression agent cannot be discharged. This is because a discharged cartridge will not have enough pressurized gas to pressurize the mechanism which opens the valve(s) of the cylinders holding the fire suppression agent. Although the cartridge replacement aid is described in terms of being used with disposable cartridges, the cartridge replacement aid may, in certain instances, be used with refillable cartridges.

In conjunction with what is described below, the cartridge replacement aid, in certain instances, can help to ensure replacement of the disposable cartridge following each discharge by providing a visual indication that actuation has occurred, and/or by preventing the cam from being reset following actuation without first removing the cartridge replacement aid. Regardless of the configuration of the cartridge replacement aid, the cartridge replacement aid helps to ensure the cartridge is removed and replaced by requiring the removal of the cartridge replacement aid following actuation of the fire suppression system. To remove the cartridge replacement aid, in certain instances, the cartridge must first be removed. By requiring the cartridge to be removed first the cartridge will presumably be replaced by the individual removing the cartridge, as the individual will be able see that the cartridge is empty upon removal.

Fire suppression systems for many types of applications especially industrial and commercial applications, use disposable pressurized gas cartridges. With reference now to the Figures, an exemplary fire suppression system 100 used in a commercial cooking application is schematically shown in FIG. 1, which incorporates a cartridge replacement aid 120, shown in FIGS. 2-7, within the control box 110. The control box 110, in certain instances, includes a window 111 to allow the cartridge replacement aid 120 to be visually inspected within the control box 110. In certain instances, the control box 110 may be able to be opened using a door (not shown) to allow the cartridge replacement aid 120 to be visually inspected within the control box 110.

Figure 2:
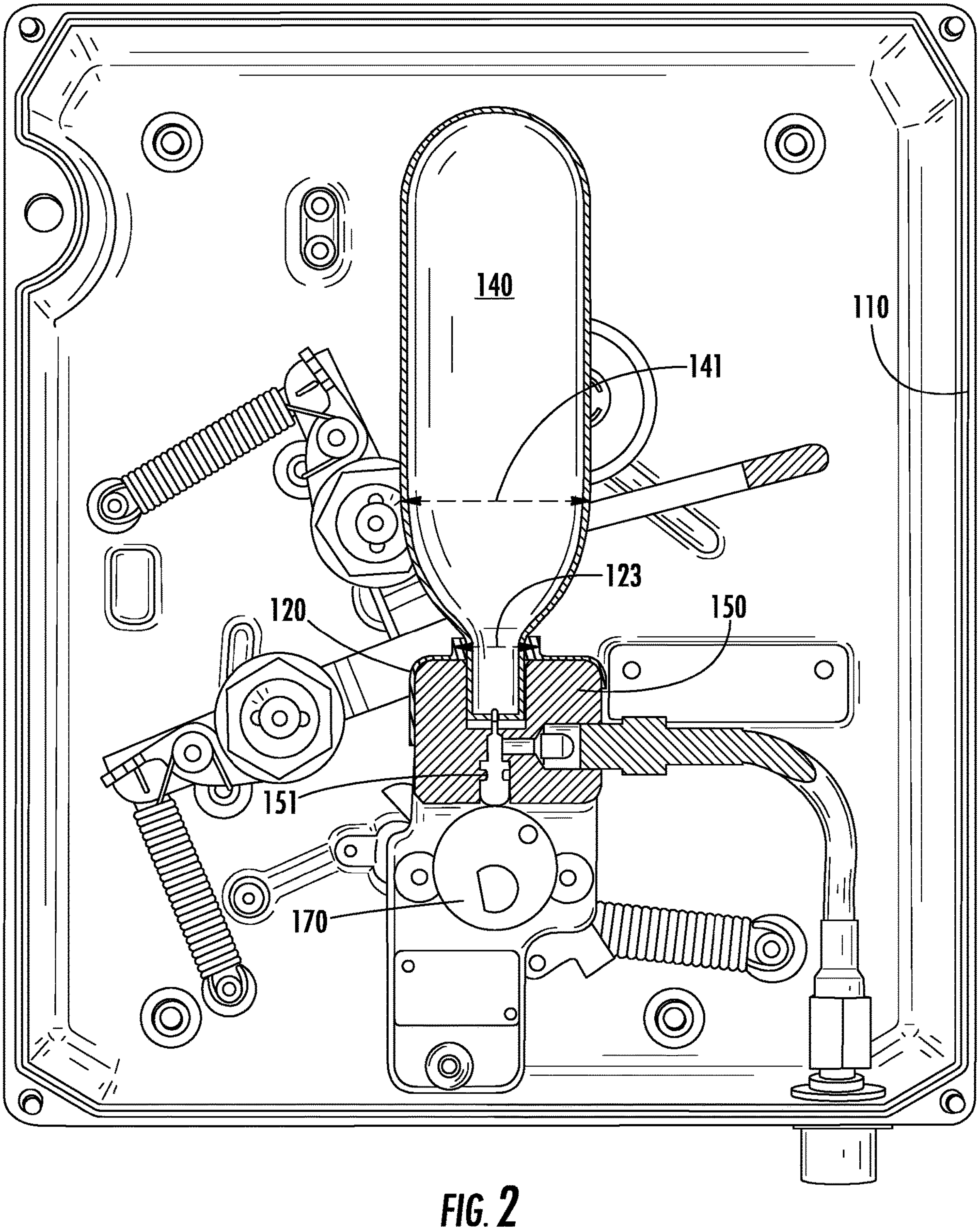
FIG. 2 is a cross-sectional view of a cartridge replacement aid installed within a fire suppression system in accordance with one aspect of the disclosure.

As shown in FIG. 2, within the control box 110 the exemplary fire suppression system 100 includes a cartridge 140 for holding a pressurized gas, the cartridge 140 operatively connected to a valve 150. The fire suppression system 100 also includes a cam 170 for engaging a piercing pin 151, the piercing pin 151 configured to release the pressurized gas from within the cartridge 140 when engaged. The cam 170, when rotating, may cause the piercing pin 151 move toward the cartridge 140. In certain instances, the piercing pin 151 moves toward the cartridge 140 due to the shape of the cam 170, for example, an oval shape of the cam 170 may push the piercing pin 151 as the cam 170 rotates. In certain instances, the piercing pin 151 moves toward the cartridge 140 due to a connecting member (not shown) connected to the piercing pin 151 and the cam 170, for example, the connecting member may cause the piercing pin 151 to move towards the cartridge 140 as the cam 170 rotates. The connecting member may, in certain instances, be a spring, cantilever, or any suitable mechanism to cause the piercing pin 151 to move toward the cartridge 140.

The cartridge replacement aid 120 is configured between the cartridge 140 and the cam 170. The cartridge replacement aid 120 includes an aperture 121, shown in FIGS. 3-5, configured to allow the cartridge 140 to pass through the cartridge replacement aid 120 and connect to the valve 150. The cartridge replacement aid 120 also includes a protrusion 122, shown in FIGS. 3-7, configured to perpendicularly extend from the cartridge replacement aid 120.

In certain instances, the cartridge replacement aid 120 is configured to fit over at least a portion of the valve 150. Fitting over at least a portion of the vale 150, in certain instances, means that at least a portion of the cartridge replacement aid 120 is in contact with the surface of the valve 150. The cartridge replacement aid 120, in certain instances, is configured to fit over at least a portion of the valve 150, and is not removable without first removing the cartridge 140. In certain instances, the cartridge replacement aid 120 is replaced when the cartridge 140 is replaced.

Figure 5:
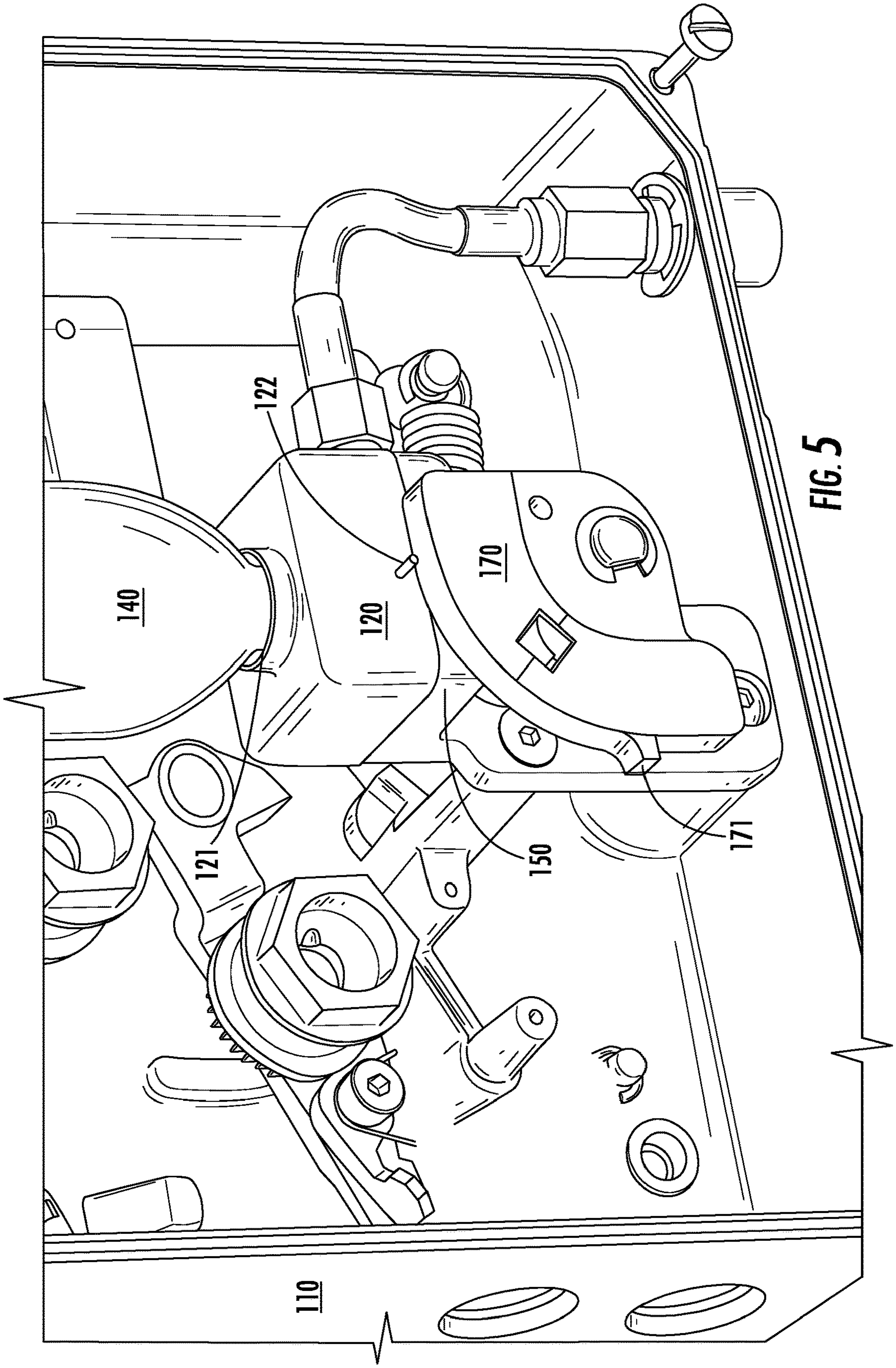
FIG. 5 is a perspective view of a third embodiment of a cartridge replacement aid installed within a fire suppression system in accordance with one aspect of the disclosure.

As shown in FIG. 5, in certain instances, the cam 170 includes a projection 171. The cam 170 with the projection 171, in certain instances, is formed as one unified component. The projection 171, in certain instances, is formed separately from the cam 170 and is connected to the cam, for example, the projection 171 may be adhered to the cam 170. The projection 171, in certain instances, is configured to break the protrusion 122 of the cartridge replacement aid 120 when the cam 170 engages the piercing pin 151. For example, the breaking of the protrusion 122 of the cartridge replacement aid 120 by the projection 171 of the cam 170, in certain instances, is achievable due to the amount of force created by the rotation of the cam 170 (shown in the Figures as counter-clockwise). To allow for the protrusion 122 to break, the protrusion 122 may, in certain instances, be configured out of a brittle material. The rotation of the cam 170 may, in certain instances, be created by a coil (not shown) or coil-like mechanism connected to the cam 170. Although described herein that the cam 170 rotates counter-clockwise during actuation, and is reset in a clockwise manner, it is envisioned that the cam 170, in certain instances, could be configured to rotate clockwise during actuation, and reset in a counter-clockwise manner. It is envisioned that projection 171 of the cam 170 may be configured to break the protrusion 122 of the cartridge replacement aid 120, regardless of the specific movement of the cam 170, for example, regardless of whether the cam 170 rotates or whether the cam 170 engages the piercing pin 151 by sliding.

In certain instances, the cartridge replacement aid 120 indicates, by a broken protrusion 122, that the cartridge 140 has not been replaced following actuation. An unbroken protrusion 122 is shown in FIG. 5. A broken protrusion 122, in certain instances, means that at least a portion of the protrusion 122 has been either bent or severed from the cartridge replacement aid 120. The broken protrusion 122, in certain instances, is viewable through the window 111 in the control box 110, or through opening a door (not shown) in the control box 100. An individual, by observing a broken protrusion 122, may be alerted that the fire suppression system 100 was actuated and the cartridge 140 has not yet been replaced. In some instances the cam 170 may include an additional visual indicator (not shown), such as colors (for example, red and green, although other colors may be used) or writing, that may be viewable through the window 111 in the control box 110 and/or may be aligned with the protrusion 122 or another marking on the cam 170, such that when the cam 170 moves during discharge the additional visual indicator provides a secondary visual indication that the cam 170 has not been reset following discharge of the fire suppression system 100. As described below, in certain embodiments the cam 170 may not be reset until the cartridge 140 is removed and/or the cartridge aid 120 is repaired or replaced.

The cartridge replacement aid 120, by providing for the protrusion 122 to break, acts as a visual indicator that the cartridge 140 needs to be replaced. Once the protrusion 122 is broken, in certain instances, the entire cartridge replacement aid 120 should be removed and replaced with a new cartridge replacement aid 120 with an unbroken protrusion 122. To remove the cartridge replacement aid 120, in certain instances, the cartridge 140 must first be removed. By requiring of the removal of the cartridge 140 prior to removing the cartridge replacement aid 120, in certain instances, helps to ensure that the cartridge 140 is replaced following actuation.

As shown in FIGS. 3, 4, 6, and 7, in certain instances, the cartridge replacement aid 120 is configured to prevent the reset of the cam 170 without removing the cartridge replacement aid 120. Preventing the cam 170 from being reset, in certain instances, is completed using a ratchet-like mechanism, meaning that the configuration and relative position of the various components allows for the movement in one direction, but prevents the movement in the opposite direction. For example, in certain instances, the projection 171 of the cam 170 operates in a ratchet-like manner with the protrusion 122 of the cartridge replacement aid 120, where the projection 171 of the cam is configured to rotate past the protrusion 122 of the cartridge replacement aid 120. Once past the protrusion 122 of the cartridge replacement aid 120, the relative position and configuration of the projection 171 of the cam 170 and the protrusion 122 of the cartridge replacement aid 120 prevents the cam 170 from being reset (i.e. rotated in the opposite direction) without removing the cartridge replacement aid 120.

Figure 3:
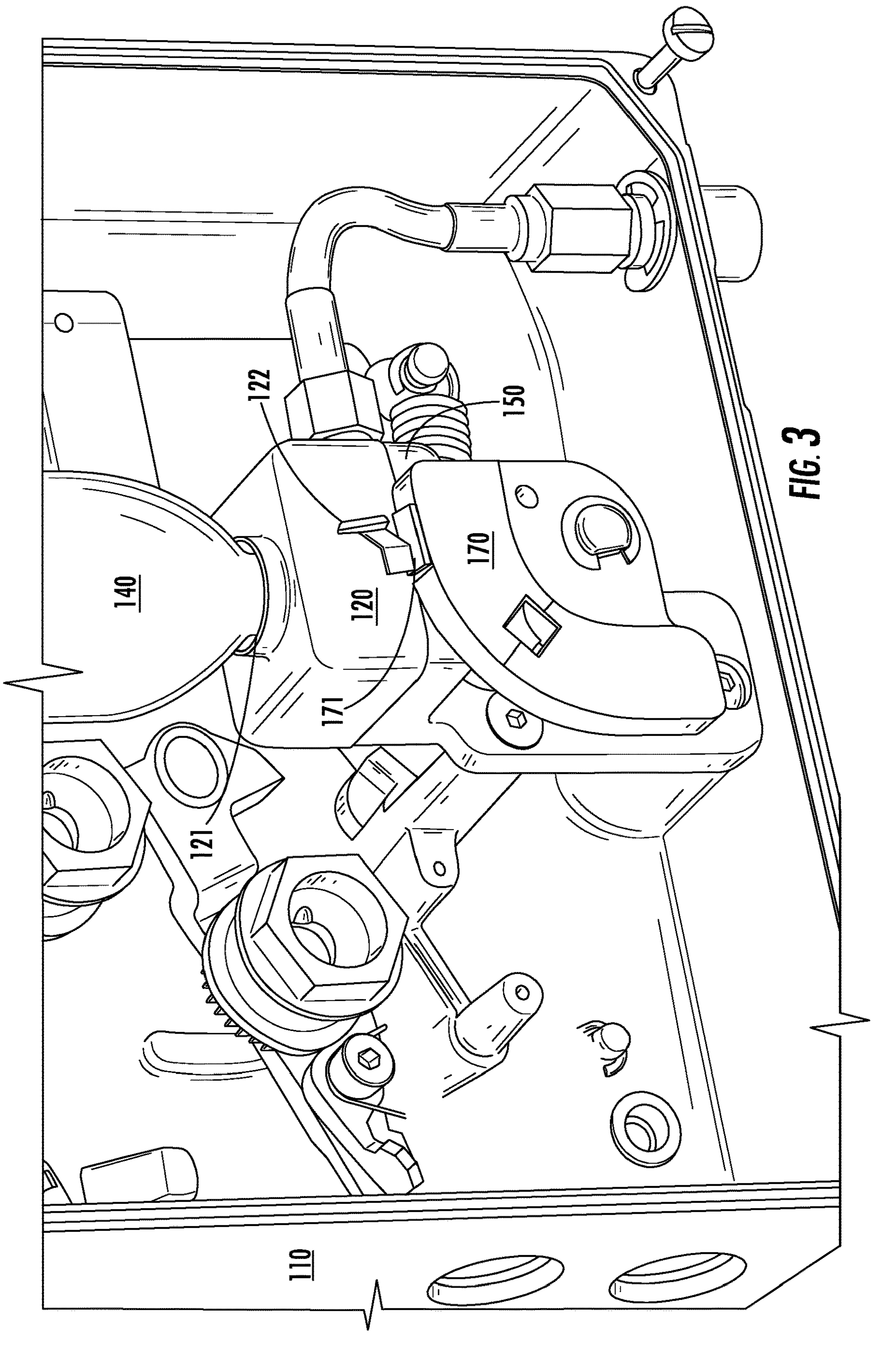
FIG. 3 is a perspective view of a first embodiment of a cartridge replacement aid installed within a fire suppression system in accordance with one aspect of the disclosure.
Figure 6:
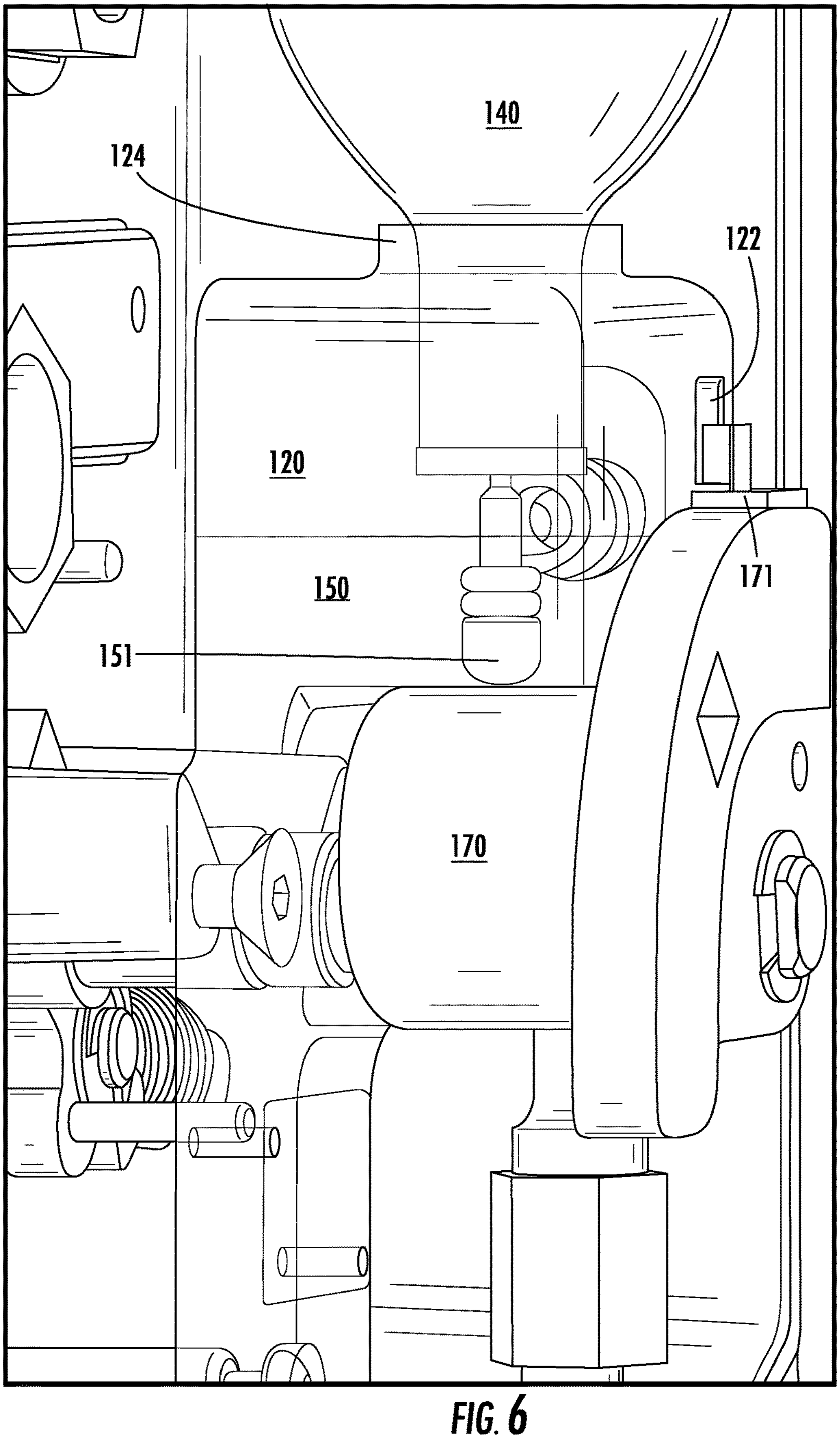
FIG. 6 is a partially transparent perspective side view of the first embodiment of the cartridge replacement aid shown in FIG. 3.
Figure 7:
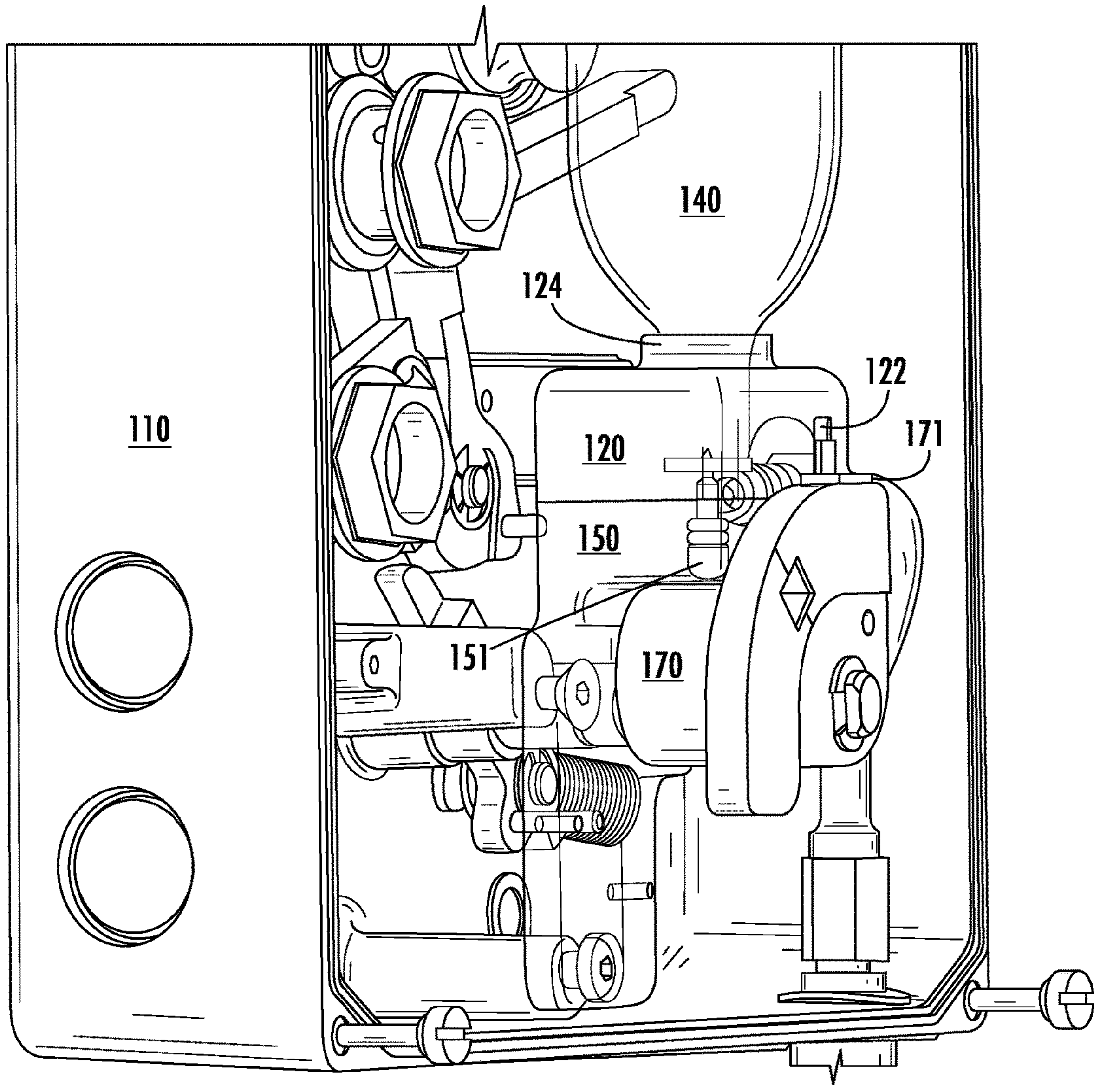
FIG. 7 is a partially transparent perspective side view of the first embodiment of the cartridge replacement aid shown in FIGS. 3 and 6, shown at a different angle and less magnified than FIG. 6.

A ratchet may include a pawl and a tooth. The pawl functions as a spring-loaded flexible member when the ratchet is rotated in one direction and as a fixed member when the ratchet is attempted to be rotated in the opposite direction. The tooth functions as a fixed member regardless of which direction the ratchet is rotated. The pawl is designed to bias, or "spring", back to its original shape once the pawl passes the tooth. In certain instances, as shown in FIGS. 3, 6, and 7, the projection 171 of the cam 170 acts as a spring-loaded pawl of a ratchet, and the protrusion 122 of the cartridge replacement aid 120 acts as a tooth of a ratchet. The projection 171 of the cam 170, when configured in this manner, may, when the fire suppression system 100 is actuated, rotate past the protrusion 122 of the cartridge replacement aid 120 due to the force created by the rotation (e.g. counter-clockwise) of the cam 170. When rotating, the projection 171 of the cam 170, in certain instances, flexes away from the protrusion 122 of the cartridge replacement aid 120 due to the shear force created by the rotation of the cam 170, and biases, or "springs", back to its original shape once past the protrusion 122 of the cartridge replacement aid 120. Once actuated, in certain instances, the cam 170 cannot be reset without removing the cartridge replacement aid 120 because the projection 171 is incapable of flexing away from the protrusion 122 of the cartridge replacement aid 120 when attempted to be reset, due to the configuration (e.g. shape) and relative position of the projection 171 and the protrusion 122.

Figure 4:
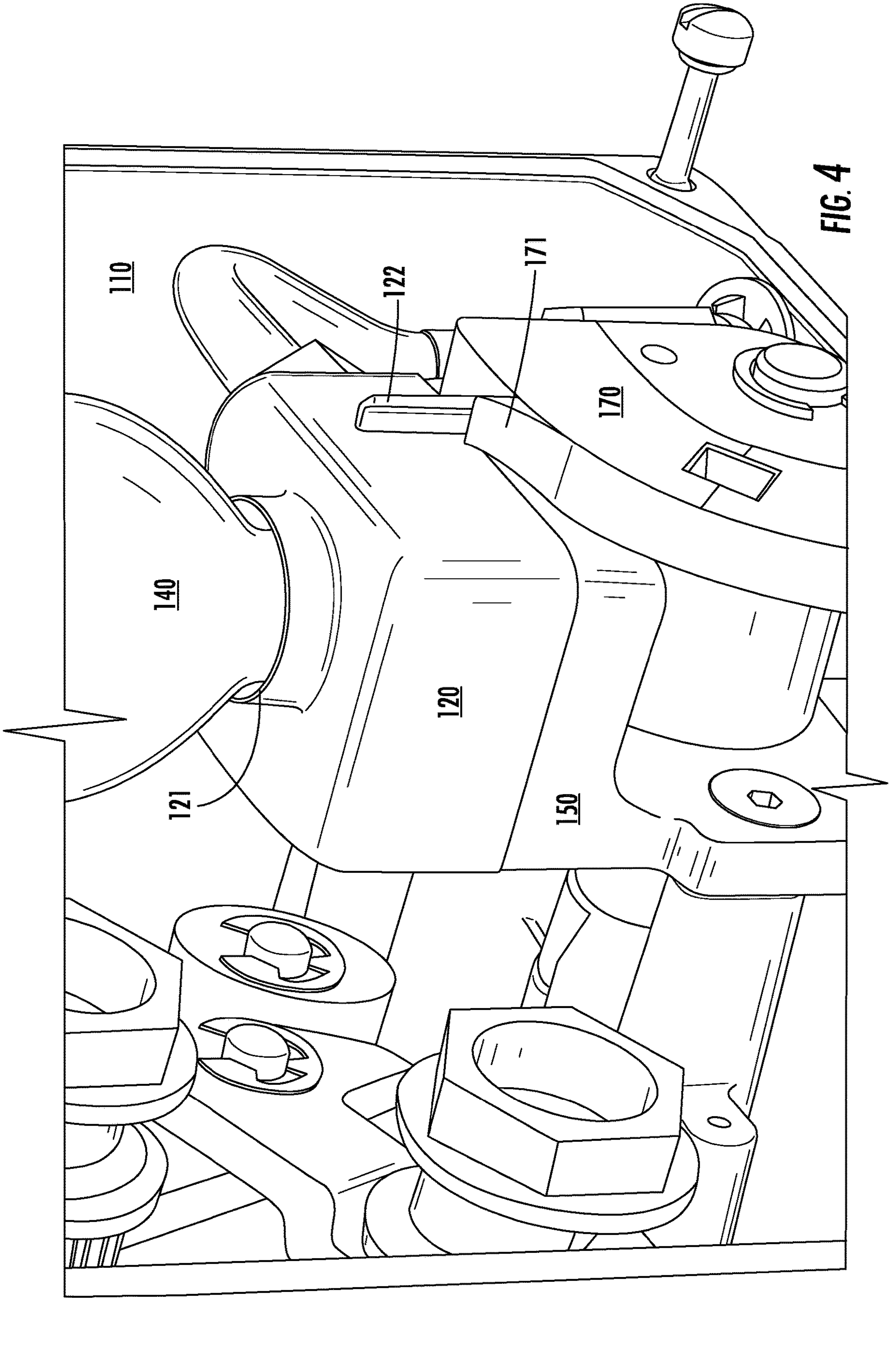
FIG. 4 is a perspective view of a second embodiment of a cartridge replacement aid installed within a fire suppression system in accordance with one aspect of the disclosure.

In certain instances, as shown in FIG. 4, the protrusion 122 of the cartridge replacement aid 120 acts as a spring-loaded pawl of a ratchet, and the projection of the cam 170 acts as a tooth of a ratchet. The projection 171 of the cam 170, when configured in this manner, may, when the fire suppression system 100 is actuated, rotate past the protrusion 122 of the cartridge replacement aid 120 due to the force created by the rotation (e.g. counter-clockwise) of the cam 170. When rotating, the protrusion 122 of the cartridge replacement aid 120, in certain instances, flexes away from the projection 171 of the cam 170 due to the shear force created by the rotation of the cam 170, and biases, or "springs", back to its original shape once past the projection 171 of the cam 170. Once actuated, in certain instances, the cam 170 cannot be reset without removing the cartridge replacement aid 120 because the protrusion 122 is incapable of flexing away from the projection 171 of the cam 170 when attempted to be reset, due to the configuration (e.g. shape) and relative position of the projection 171 and the protrusion 122.

Regardless of which component acts as the pawl or tooth of the ratchet, in certain instances, once the projection 171 of the cam 170 rotates past the protrusion 122 of the cartridge replacement aid 120, the projection 171 of the cam 170 in combination with the protrusion 122 of the cartridge replacement aid 120 prevents the cam 170 from being reset without first removing the cartridge replacement aid 120 due to the configuration and the relative position of the projection 171 and the protrusion 122. For example, the respective shape and relative position of the protrusion 122 and projection 171 may allow for flexing when the cam 170 is rotated in one direction, but prevent flexing when the cam 170 is attempted to be rotated in the opposite direction. This may be due, at least in part, to the component, which acts as the pawl of a ratchet, biasing, or "springing", back to its original shape once past the component, which acts as the tooth of a ratchet.

To remove the cartridge replacement aid 120, in certain instances, the cartridge 140 should be removed prior to removing the cartridge replacement aid 120. To ensure that the cartridge 140 is removed prior to the cartridge replacement aid 120, in certain instances, an aperture diameter 123 (shown in FIG. 2) is configured to be smaller relative to a cartridge diameter 141. By configuring the aperture diameter 123 smaller than the cartridge diameter 141, the cartridge 140, in certain instances, cannot pass through the aperture 121 of the cartridge replacement aid 120. As such, to allow the cartridge replacement aid 120 to be removed and replaced, in certain instances, the cartridge 140 must be removed first. By requiring the cartridge 140 to be removed first, the cartridge replacement aid 120 helps to ensure that the cartridge 140 is replaced following actuation.

As shown in FIG. 7, to further ensure that the cam 170 isn't reset without removing the cartridge replacement aid 120, in certain instances, the cartridge replacement aid 120 further includes a collar 124. The collar 124 may be configured to perpendicularly extend from the cartridge replacement aid 120 circumferentially around the aperture 121. The collar 124, in certain instances, helps to prevent the cartridge replacement aid 120 from being slid up the cartridge 140 away from the valve 150. By preventing the sliding of the cartridge replacement aid 120 up the cartridge 140 away from the valve 150 and the cam 170, the collar 124 may help prevent the resetting of the cam without removing the cartridge replacement aid 120.

It is envisioned that the design and configuration of the cartridge replacement aid 120 helps to ensure that the cartridge 140 is replaced following actuation. Regardless of whether the cartridge replacement aid 120 is designed to be replaced after each use or is designed for multiple uses, in certain instances the cartridge replacement aid 120 may be designed in a cost effective manner. In certain instances, the cartridge replacement aid 120 is produced using an injection molding process. In certain instances, the cartridge replacement aid 120 is produced using a three-dimensional (3D) printing process. In certain instances, the projection 122 may be replaced following actuation on-site at the installed fire suppression system using a 3D printing process. In certain instances, the cartridge replacement aid 120 is manufactured out of a plastic. In certain instances, the cartridge replacement aid 120 is manufactured out of a metal, for example, sheet metal.

The cartridge replacement aid 120 is designed and configured to help ensure that the cartridge 140 is replaced after actuation so that the cartridge 140 is capable of providing enough pressurized gas to pressurize the actuation line and cause valves(s) of the cylinder(s) holding the fire suppression agent to open. In certain instances, the pressurized gas contained by the cartridge 140 may include nitrogen or carbon dioxide. The fire suppression agent within the cylinder 160 may be any suitable fire suppression agent. For example, in certain instances, the fire suppression agent can include sodium bicarbonate, potassium bicarbonate, or monoammonium phosphate. By ensuring the cartridge 140 is replaced following actuation, the cartridge replacement aid 120 helps to ensure that the fire suppression agent is able to be released from the cylinder 160 when a fire risk is detected.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fire suppression system comprising:

a cartridge for holding a pressurized gas, the cartridge operatively connected to a valve;

a cam for engaging a piercing pin, the piercing pin configured to release the pressurized gas when engaged; and a cartridge replacement component configured between the cartridge and the cam, the cartridge replacement component comprising:

an aperture configured to allow the cartridge to pass through the cartridge replacement component and connect to the valve; and a protrusion configured to perpendicularly extend from the cartridge replacement component.

2. The fire suppression system of claim 1, wherein the cartridge replacement component is configured to fit over at least a portion the valve.

3. The fire suppression system of claim 1, wherein the cartridge replacement component is configured within a control box, the control box comprising a window configured to allow the cartridge replacement component to be visually inspected.

4. The fire suppression system of claim 1, wherein the cam comprises a projection, the projection configured to break the protrusion of the cartridge replacement component when engaging the piercing pin.

5. The fire suppression system of claim 4, wherein a broken protrusion indicates that the cartridge has not been replaced.

6. The fire suppression system of claim 1, wherein the cam comprises a projection, the projection in combination with the protrusion configured to prevent the cam from being reset without removing the cartridge replacement component.

7. The fire suppression system of claim 1, wherein the cartridge replacement component further comprises a collar configured to perpendicularly extend from the cartridge replacement component circumferentially around the aperture.

8. The fire suppression system of claim 7, wherein the collar is configured to prevent the cam from being reset without removing the cartridge replacement component.

9. The fire suppression system of claim 1, wherein a diameter of the aperture is smaller relative to a diameter of the cartridge.

10. The fire suppression system of claim 9, wherein the aperture diameter prevents the removal of the cartridge replacement component without removing the cartridge.

11. The fire suppression system of claim 1, wherein the fire suppression system further comprises a cylinder for holding a fire suppression agent.

* * * * *